(12) United States Patent
Tang et al.

(10) Patent No.: US 9,121,684 B2
(45) Date of Patent: Sep. 1, 2015

(54) METHOD FOR REDUCING WAFER SHAPE AND THICKNESS MEASUREMENT ERRORS RESULTED FROM CAVITY SHAPE CHANGES

(71) Applicant: KLA-Tencor Corporation

(72) Inventors: Shouhong Tang, Santa Clara, CA (US); Andrew An Zeng, Milpitas, CA (US); Yi Zhang, Sunnyvale, CA (US); Jie-Fei Zheng, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 67 days.

(21) Appl. No.: 13/742,113

(22) Filed: Jan. 15, 2013

(65) Prior Publication Data

US 2013/0182262 A1 Jul. 18, 2013

Related U.S. Application Data

(60) Provisional application No. 61/587,394, filed on Jan. 17, 2012.

(51) Int. Cl.
*G01B 11/02* (2006.01)
*G01B 9/02* (2006.01)

(52) U.S. Cl.
CPC ........ *G01B 9/02076* (2013.01); *G01B 9/02027* (2013.01)

(58) Field of Classification Search
CPC .......... G01B 11/2441; G01B 9/02055; G01B 9/02062; G01B 9/02061; G01B 9/02072; G01B 9/02076; G01B 9/02083; G01B 9/02027
USPC ........................................................ 356/503
See application file for complete search history.

(56) References Cited

U.S. PATENT DOCUMENTS

| 6,583,640 B2 * | 6/2003 | Eriguchi et al. ............ 324/762.1 |
| 6,847,458 B2 * | 1/2005 | Freischlad et al. ............. 356/503 |
| 7,280,187 B1 * | 10/2007 | Yoshida ....................... 356/35.5 |
| 2007/0098415 A1 * | 5/2007 | Lupo et al. .................... 398/197 |

* cited by examiner

*Primary Examiner* — Tri Ton
*Assistant Examiner* — Willie Merrell, II
(74) *Attorney, Agent, or Firm* — Suiter Swantz pc llo

(57) ABSTRACT

Methods and systems for reducing wafer shape and thickness measurement errors resulted from cavity shape changes are disclosed. Cavity calibration process is performed immediately before the wafer measurement. Calibrating the cavity characteristics every time the method is executed reduces wafer shape and thickness measurement errors resulted from cavity shape changes. Additionally or alternatively, a polynomial fitting process utilizing a polynomial of at least a second order is utilized for cavity tilt estimation. High order cavity shape information generated using high order polynomials takes into consideration cavity shape changes due to temperature variations, stress or the like, effectively increases accuracy of the wafer shape and thickness information computed.

19 Claims, 5 Drawing Sheets

METHOD FOR REDUCING WAFER SHAPE AND THICKNESS MEASUREMENT ERRORS RESULTED FROM CAVITY SHAPE CHANGES

CROSS-REFERENCE TO RELATED APPLICATIONS

The present application claims the benefit under 35 U.S.C. §119(e) of U.S. Provisional Application Ser. No. 61/587,394, filed Jan. 17, 2012. Said U.S. Provisional Application Ser. No. 61/587,394 is hereby incorporated by reference in its entirety.

TECHNICAL FIELD

The disclosure generally relates to the field of measuring technology, particularly to methods for reducing wafer shape and thickness measurement errors resulted from cavity shape changes.

BACKGROUND

Thin polished plates such as silicon wafers and the like are a very important part of modern technology. A wafer, for instance, refers to a thin slice of semiconductor material used in the fabrication of integrated circuits and other devices. Other examples of thin polished plates may include magnetic disc substrates, gauge blocks and the like. While the technique described here refers mainly to wafers, it is to be understood that the technique also is applicable to other types of polished plates as well.

Generally, certain requirements may be established for the flatness and thickness uniformity of the wafers. There exist a variety of techniques to address the measurement of shape and thickness variation of wafers. One such technique is disclosed in U.S. Pat. No. 6,847,458, which is capable of measuring the surface height on both sides and thickness variation of a wafer. It combines two phase-shifting Fizeau interferometers to simultaneously obtain two single-sided distance map between each side of a wafer and corresponding reference flats, and computes thickness variation and shape of the wafer from the data and calibrated distance map between two reference flats. However, this technique only reduces errors caused by the tilt or the first order of cavity shape changes. It cannot remove errors caused by higher order shape changes of the cavity, including changes caused by temperature or stress.

Therein lies a need for methods for reducing wafer shape and thickness measurement errors resulted from cavity shape changes without the aforementioned shortcomings.

SUMMARY

The present disclosure is directed to a method for measuring the thickness variation and shape of wafers. The method includes: calibrating characteristics of a cavity formed between reference flats in two opposing interferometer channels; placing a wafer in the cavity immediately upon completion of calibrating the cavity characteristics; synchronizing the interferograms in the two interferometer channels by supplying the light from a single wavelength tunable laser light source, the output beam of which is split by a beam splitter to propagate to both interferometer channels; measuring the cavity characteristics of the reference flats forming the cavity providing an oversized field of view of the wafer in the cavity for obtaining a difference map in the cavity areas outside of the wafer and measuring the cavity tilt of the reference flats; and determining the thickness variations of the wafer based on the cavity characteristic measurements and the cavity tilt of the reference flats. In accordance with the present disclosure, the cavity characteristics are calibrated every time the method is executed to reduce wafer shape and thickness measurement errors resulted from cavity shape changes.

A further embodiment of the present disclosure is also directed to a method for measuring the thickness variation and shape of wafers. The method includes placing a wafer in a cavity formed between reference flats in two opposing interferometer channels; synchronizing the interferograms in the two interferometer channels by supplying the light from a single wavelength tunable laser light source, the output beam of which is split by a beam splitter to propagate to both interferometer channels; measuring the cavity characteristics of the reference flats forming the cavity providing an oversized field of view of the wafer in the cavity for measuring the cavity tilt of the reference flats; obtaining a difference map in the cavity areas outside of the wafer; surface fitting a polynomial of at least a second order to the difference map; utilizing coefficients of the polynomial determined by surface fitting to provide cavity tilt estimation; and determining the thickness variations of the wafer based on the cavity characteristic measurements and the cavity tilt estimation. High order cavity shape information generated using high order polynomials takes into consideration cavity shape changes due to temperature variations, stress or the like, effectively increases accuracy of the wafer shape and thickness information computed.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

The present disclosure is directed to reducing wafer shape and thickness measurement errors resulted from cavity shape changes in wafer dimensional geometry tools such as the WaferSight metrology system from KLA-Tencor. More specifically, between the completion of system calibration and the time that wafer measurements are taken, changes such as temperature variations or stress may have already caused the shape of the measurement cavity to change. As the demand for the measurement accuracy of the wafer thickness variation increases dramatically, the rigid body assumption of the reference flats is no long valid. Therefore, cavity shape changes need to be taken into consideration in wafer dimensional geometry tools in order to reduce wafer shape and thickness measurement errors.

Figure 1:
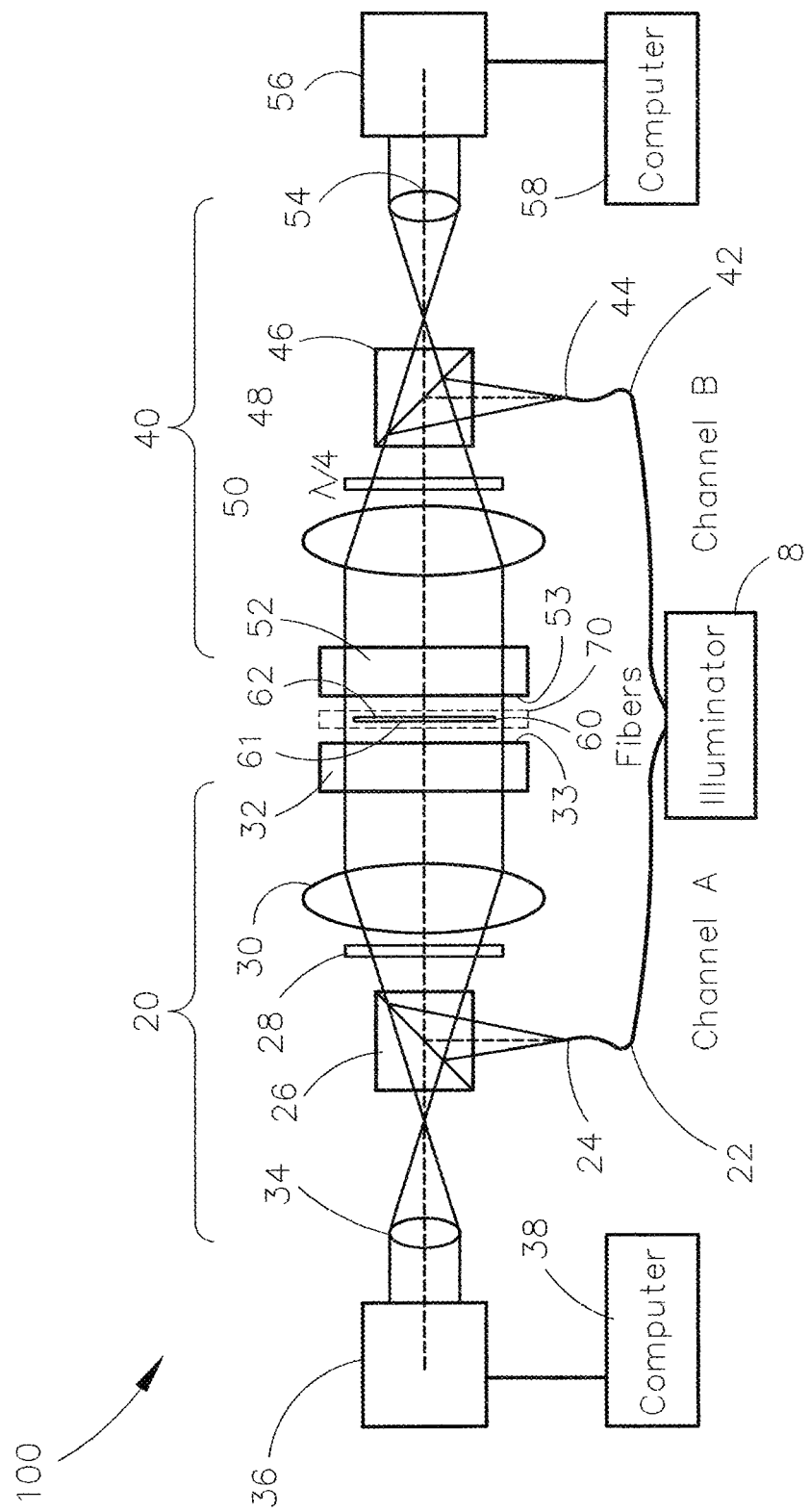
FIG. 1 is a diagrammatic representation of an interferometer system for measuring shape and thickness variation of a wafer.

Referring to FIG. 1, a block diagram depicting the measurement system 100 that utilizes two Fizeau interferometers similar to that disclosed in U.S. Pat. No. 6,847,458 (the disclosure of which is incorporated herein by reference in its entirety) is shown. As depicted in FIG. 1, the measurement system 100 is configured for measuring the shape and thickness of a wafer 60. The wafer 60 may be placed in a cavity in the center between two Fizeau interferometers 20 and 40. The reference flats 32 and 52 of the interferometers are placed close to the wafer 60.

The measurement system 100 provides two light sources for Channel A and Channel B through fiber 22 and fiber 42 from a single illuminator 8 that generates a constant power output during its wavelength tuning. In one embodiment, the light source 24,44 provides light that passes through a quarter-wave plate 28,48 aligned at 45° to the polarization direction of light after it is reflected from the polarizing beam splitter 26,46. This beam then propagates to the lens 30,50, where it is collimated with a beam diameter larger than the wafer diameter.

The beam then goes through transmission flat 32,52, where the central part of the transmitted beam is reflected at the test surface 61,62 that forms an interferogram with the light beam reflected from the reference surface 33,53. The outer part of the transmitted beam travels on to the opposite reference flat 52,32, where it is reflected at the reference surface 53,33 that forms an annular shape interferogram with the light beam reflected from the reference surface 33,53. An interferogram detectors (e.g., an imaging device such as a camera or the like) 36,56 is utilized to record the interferograms and send the interferograms to a computer 38,58 for processing to produce the desired information such as the shape and the thickness variation of a wafer.

Figure 2:
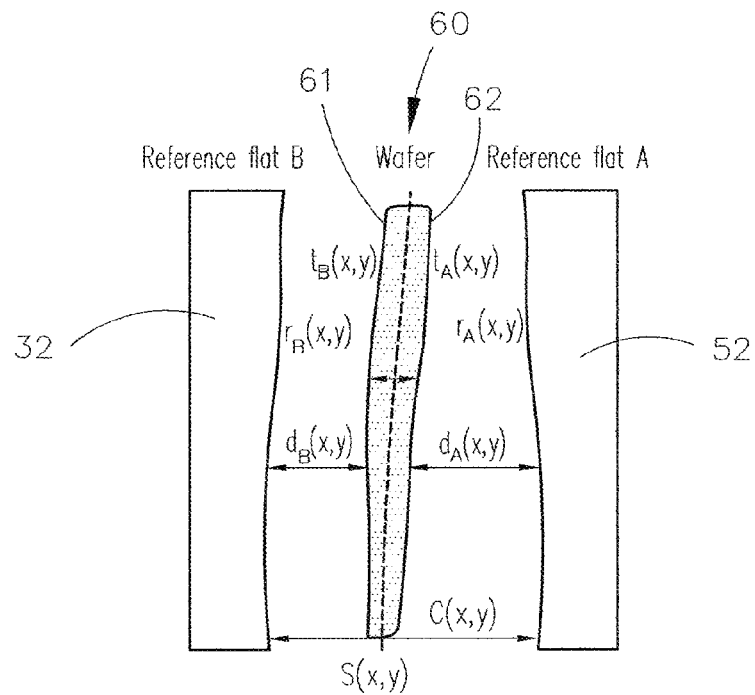
FIG. 2 is an illustration depicting a wafer placed in the measurement cavity of the interferometer system.

Theoretically, the measurement system as described above allows the thickness variation of a wafer to be measured without the effect of cavity shape. FIG. 2 depicts how to compute the wafer thickness variation that is independent of the flatness of reference flat A 52 and reference flat B 32. Let $\phi_A$ denote the interferogram phase related to the optical path difference between the wafer surface $t_A$ and the reference A surface $r_A$. Similarly, let $\phi_B$ denote the interferogram phase related to the optical path difference between the wafer surface $t_B$ and the reference B surface $r_B$. In addition, let $\phi_C$ denote the interferogram phase related to the optical path difference between the reference B surface $r_B$ and the reference A surface $r_A$.

It is noted that the distance d between two surfaces is related to its inteferogram phase $\phi$. The relationship can be express as:

$$d(x, y) = \frac{\lambda}{4\pi}(\phi(x, y) + 2n\pi) \qquad \text{Equation 1}$$

Where $\lambda$ is the wavelength utilized by the Fizeau interferometers and n is an unknown constant that is independent of the location (x,y) and can be disregarded. Thus the wafer thickness variation f(x,y) can be determined by:

$$f(x, y) = C(x, y) - d_A(x, y) - d_B(x, y) = \frac{\lambda}{4\pi}\phi_f \qquad \text{Equation 2}$$

where:

$$\phi_f(x,y) = \phi_C(x,y) - \phi_A(x,y) - \phi_B(x,y) \qquad \text{Equation 3:}$$

Since the constant $2n\pi$ term in equation 2 is eliminated, f(x,y) obtained is not the wafer absolute thickness but rather the wafer thickness variation.

Figure 3:
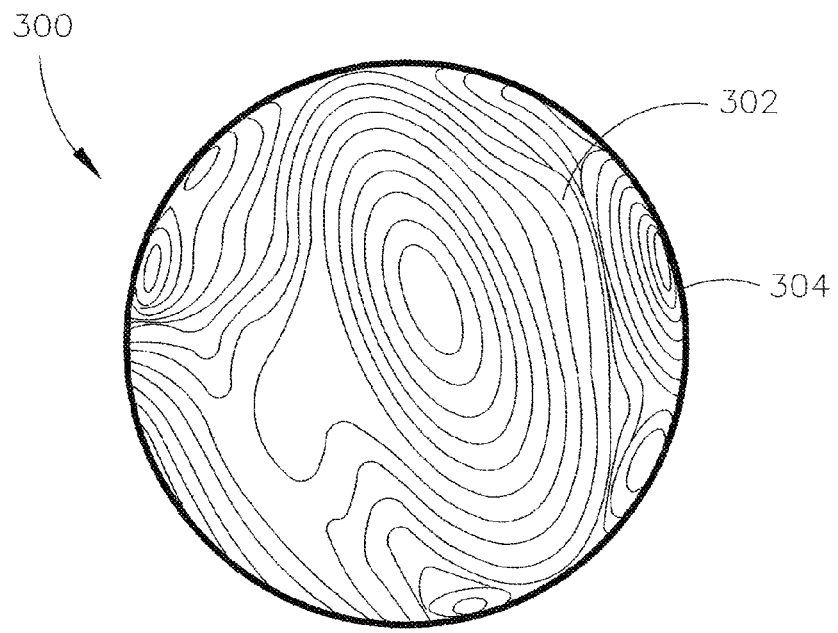
FIG. 3 is an illustration depicting a wafer surface interferogram obtained utilizing the interferometer system.

It is clearly depicted in FIG. 2 and Equation 3 that the phase $\phi_f$ can be computed if $\phi_C$, $\phi_A$ and $\phi_B$ at every location (x,y) are known during each measurement. However, the cavity phase $\phi_C$ may not be readily available at every location (x,y) since during the wafer measurement the cavity is blocked by the opaque measuring wafer 60. FIG. 3 is an illustration depicting an exemplary interferogram 300 acquired by the interferometer 40 (or interferometer 20). As shown in FIG. 3, the wafer surface interferogram related to $\phi_A$ (or $\phi_B$) 302 and the cavity areas outside of the wafer (in the form of a small ring 304 in this particular example) are obtained.

Figure 4:
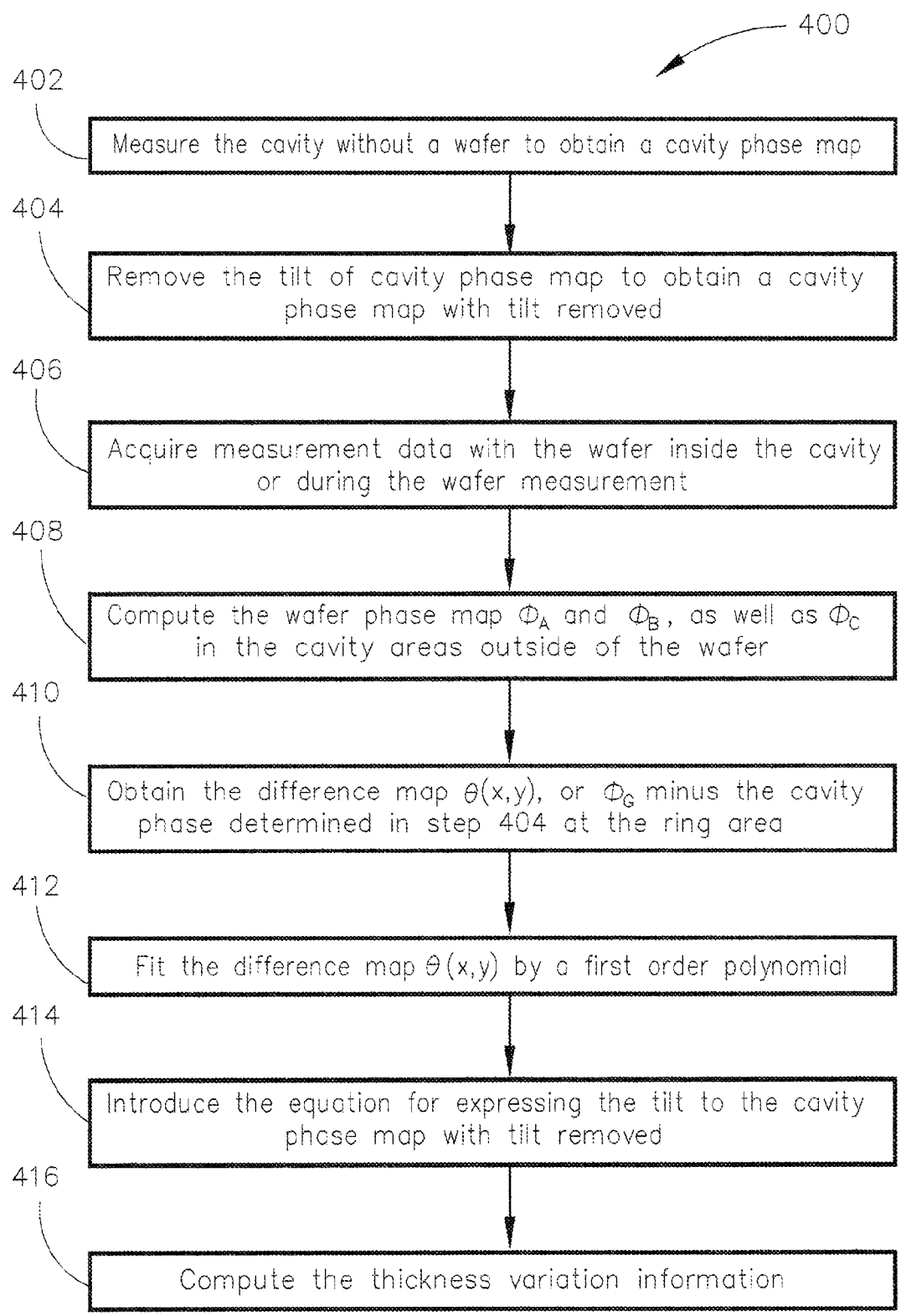
FIG. 4 is a flow diagram illustrating a method for measuring the shape and thickness variation of a wafer.

Several techniques may be utilized in order to obtain the cavity phase $\phi_C$ blocked by the measuring wafer 60. For instance, as depicted in method 400 shown in FIG. 4, measurement of the cavity without a wafer in it may be taken in step 402 to obtain a cavity phase map that is larger than the wafer in diameter. Utilizing the techniques disclosed in U.S. Pat. No. 6,847,458, step 404 may determine the tilt between the two reference surfaces and remove the tilt from the cavity phase map. Subsequently, the cavity areas outside of the wafer, in the form of a ring in the example shown in FIG. 3, can be fitted/mapped. More specifically, step 406 may acquire measurement data with the wafer inside the cavity, or during the wafer measurement, step 408 may compute the wafer phase map $\phi_A$ and $\phi_B$, as well as $\phi_C$ in the cavity areas outside of the wafer, i.e., in the form of a ring in the example shown in FIG. 3. Step 410 may then obtain the difference map $\theta(x,y)$, or $\phi_C$ minus the cavity phase determined in step 404 at this same ring area. That is, the difference map $\theta(x,y)$ represents the cavity map at the ring area obtained during wafer measurement minus the cavity map saved in the calibration process for the same area. Subsequently, step 412 may fit the difference map $\theta(x,y)$ by the first order polynomial:

$$\theta(x,y) = a_0 + a_1 x + a_2 y \qquad \text{Equation 4:}$$

Once coefficients $a_1$ and $a_2$ are determined by the fitting process, step 414 may introduce the term $a_1 x + a_2 y$ to the cavity phase map (with the tilt removed) obtained in step 404. The term $a_1 x + a_2 y$ is used in this manner to estimate the tilt for a given location (x,y). Together with the cavity phase map obtained in step 404, $\phi_C$ may be calculated for every location (x,y), and the wafer thickness variation may be calculated in step 416 using Equation 3 defined above.

In practice, while steps 406 through 416 are executed for every wafer measurement, steps 402 and 404 are considered calibration steps and are performed periodically (e.g., every 24 hours or the like). It is configured in this manner in order to provide higher throughput, and is based on the understanding that both reference flats 32 and 52 that form the cavity are rigid bodies so that add tilt to the saved map at above step 406 should be sufficient. However, as the demand for the measurement accuracy of the wafer thickness variation increases dramatically, the rigid body assumption of the reference flats is no long valid. More specifically, between the completion of system calibration (steps 402 and 404) and the time that wafer measurements are taken (steps 406 through 416), changes such as temperature variations or stress may have already caused the shape of the measurement cavity to change. Therefore, cavity shape changes need to be taken into consideration in wafer dimensional geometry tools in order to reduce wafer shape and thickness measurement errors.

Two approaches may be utilized to reduce wafer shape and thickness measurement errors resulted from cavity shape changes. In one embodiment, a system calibration is performed right before the wafer is placed into the cavity for every wafer measurement. That is, steps 402 and 404 are performed immediately prior to the rest of the measurement steps every time a new wafer is to be measured. This approach yields very good measurement result because the cavity change between the cavity measurement and the wafer measurement is very small during this short period of time therefore and can be ignored. It is understood, however, that this approach may double the measuring time and lower the system throughput.

In an alternative embodiment, a higher order polynomial (greater than the first order) is fitted to the tilt previously described in step 412. That is, the difference map $\theta(x,y)$ is fitted by a polynomial of at least the second order, such as:

$$\theta(x,y)=a_0+a_1x+a_2y+a_3x^2+a_4xy+a_5y^2+\ldots \quad \text{Equation 5:}$$

It is noted that the polynomial described above is open-ended to indicate that polynomials of higher order may be utilized without departing from the spirit and scope of the present disclosure. Using higher order polynomials increases accuracy but also introduces more coefficients that need to be determined by the polynomial fitting process. It is contemplated that specific polynomial equations used to express $\theta(x,y)$ is not limited to the polynomial described above. A more generic high order fit can be expressed as:

$$\theta(x,y)=\Sigma_{n=0}^{\infty}a_ng(x,y) \quad \text{Equation 6:}$$

where g(x,y) is a set of functions.

Furthermore, it is contemplated that while the description above references the Cartesian coordinate system (x,y), such a coordinate system is merely exemplary. Other coordinate systems such as the polar coordinate system $(r,\theta)$ may also be utilized without departing from the spirit and scope of the present disclosure.

It is also contemplated that the two approaches described above may be combined to further improve wafer measurement accuracy. Whether to implement either one or both approaches in wafer dimensional geometry tools such as the WaferSight may be determined based upon design preferences and requirements.

Figure 5:
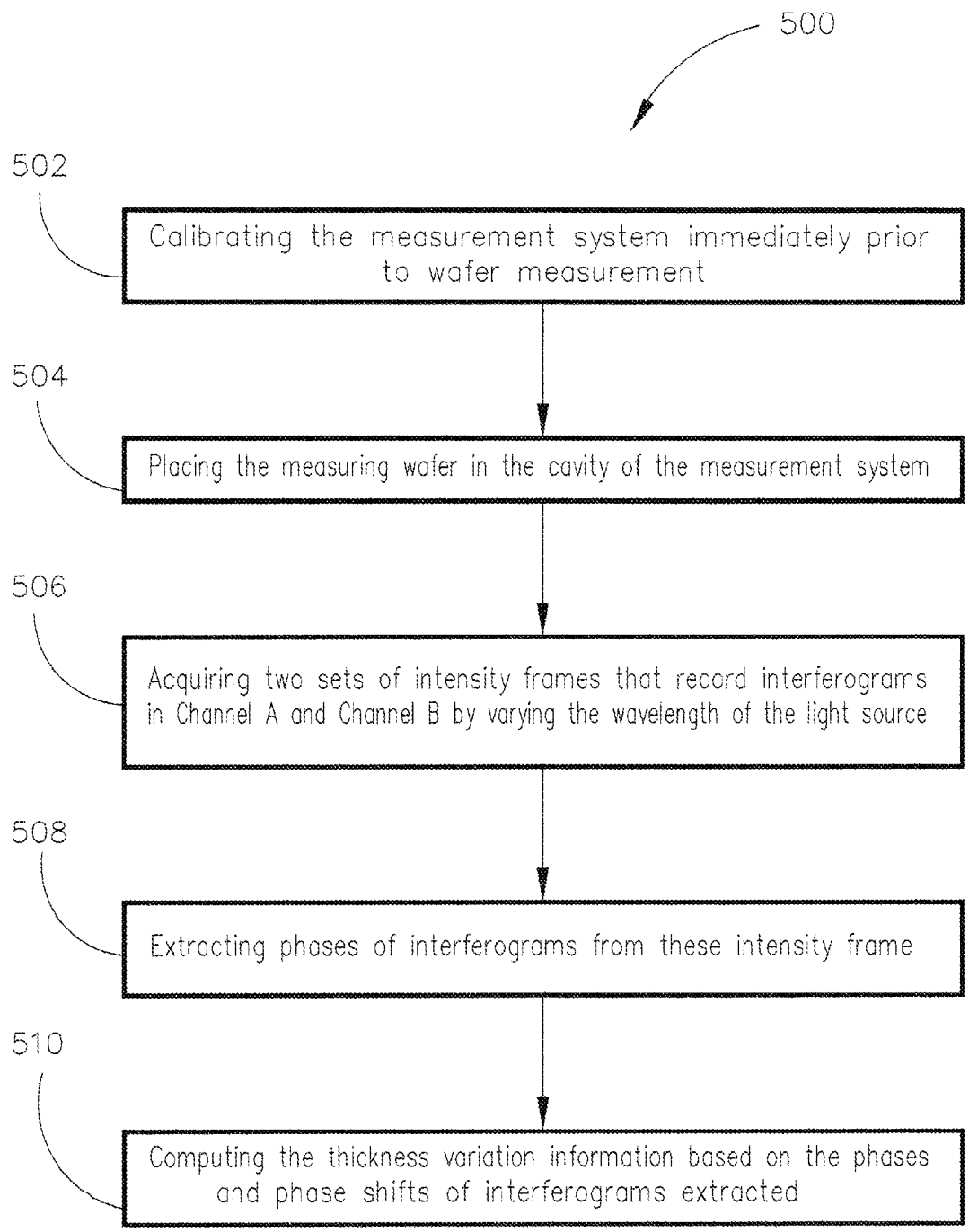
FIG. 5 is a flow diagram illustrating a method for measuring the shape and thickness variation of a wafer utilizing one of the cavity shape change error reduction techniques.

Referring now to FIG. 5, a method 500 for measuring the shape and thickness variation of a wafer utilizing the cavity shape change error reduction technique is shown. Step 502 first calibrates the measurement system. In one embodiment, the phase shifting speed of the interferograms in the two interferometer channels are first calibrated by placing a polished opaque plate in the cavity between the reference flats 32 and 52. Alternatively, this calibration may be conducted by the cavity itself (without the polished opaque plate). Upon completion of the phase shift calibration, or when the phase shift between any adjacent frames is within ±1 degree or less of its expected value such as 90 degrees for the phase shift between any adjacent frames, the cavity characteristics of the reference flats 32 and 52 is then calibrated with the cavity itself. Method 500 requires the characteristics of the reference flats 32 and 52 to be calibrated immediately prior to the rest of the measurement steps every time a new wafer is to be measured.

Once the measurement system is calibrated, the wafer 60 that is to be measured is placed in the cavity in step 504. The wafer 60 may be placed in between the two Fizeau interferometers 20 and 40 (more specifically, between the reference flats 32 and 52). A holding container may be utilized to removably secure the wafer 60 when the wafer 60 is placed in the cavity. The holding container may be configured in a manner such that both wafer sides 61 and 62 are minimally obscured by the holding container. While it may be beneficial to place the wafer 60 in the center of the cavity (i.e., the distance between the reference surface 33 and 61 is substantially equal to the distance between the reference surface 53 and 62), such a placement is not required. It is contemplated that if the wafer 60 is placed in an off-center position and/or rotated from its expected position inside the cavity, image processing algorithms associated with the imaging systems 36 and 56 may be utilized to compensate for such an off-center placement and/or rotation.

Step 506 may then acquire two sets of intensity frames that record interferograms in Channel A and Channel B by varying the wavelength of the light source 8. Step 508 may extract phases of interferograms from these intensity frames, and step 510 may compute the shape and thickness information based on the phases and phase shifts of interferograms extracted in step 508. In one embodiment, the shape and thickness information may be computed in a manner similar to that disclosed in U.S. Pat. No. 6,847,458. For instance, let A denote the phase of interferogram formed by reference flat 32 and wafer surface 61, let B denote the phase of interferogram formed by the reference flat 53 and wafer surface 62, and let C denote the phase of interferogram formed by the cavity of two reference flats 32 and 53. Thus A provides information regarding the height of the wafer surface 61, B provides information regarding the height of the wafer surface 62, and C−(A+B) provides information regarding the thickness variation of the wafer 60.

Figure 6:
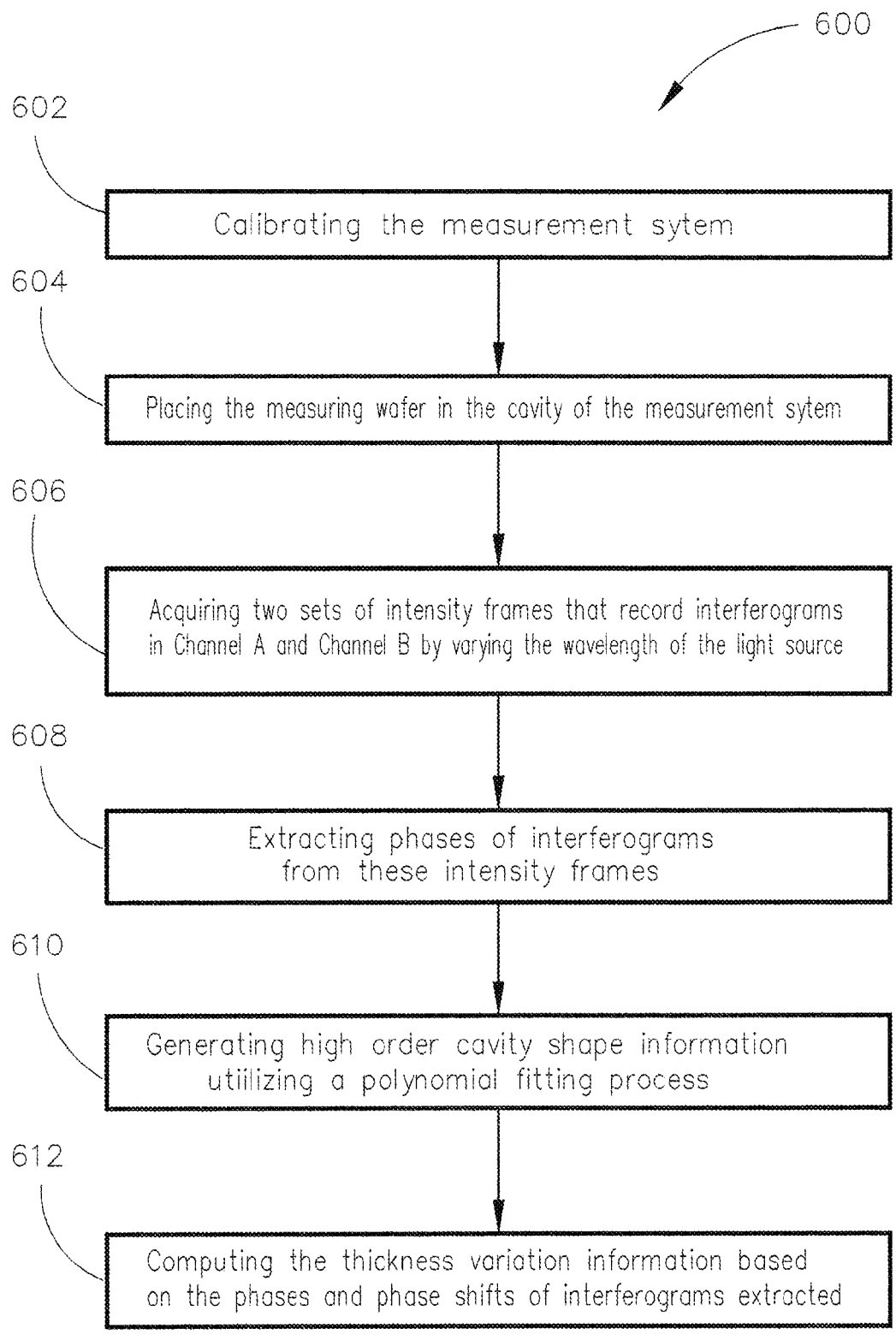
FIG. 6 is a flow diagram illustrating a method for measuring the shape and thickness variation of a wafer utilizing another cavity shape change error reduction techniques.

Referring now to FIG. 6, a method 600 for measuring the shape and thickness variation of a wafer utilizing another cavity shape change error reduction technique is shown. Step 602 first calibrates the measurement system similar to step 502 described above. However, method 600 does not require the characteristics of the reference flats 32 and 52 to be calibrated immediately prior to the rest of the measurement steps every time a new wafer is to be measured.

Similar to method 500 described above, once the measurement system is calibrated, the wafer 60 that is to be measured may be placed in the cavity in step 604, and step 606 may then acquire two sets of intensity frames that record interferograms in Channel A and Channel B by varying the wavelength of the light source 8. Step 608 may subsequently extract phases of interferograms from these intensity frames.

Different from method 500 is the generation of high order cavity shape information in step 610. High order cavity shape information generated using high order polynomials as described above takes into consideration cavity shape changes due to temperature variations, stress or the like, effectively increases accuracy of the wafer shape and thickness information computed in step 612.

It is contemplated that while the examples above referred to wafer metrology measurements, the systems and methods in accordance with the present disclosure are applicable to other types of polished plates as well without departing from the spirit and scope of the present disclosure. The term wafer used in the present disclosure may include a thin slice of semiconductor material used in the fabrication of integrated circuits and other devices, as well as other thin polished plates such as magnetic disc substrates, gauge blocks and the like.

It is to be understood that the present disclosure may be implemented in forms of a software/firmware package. Such a package may be a computer program product which employs a computer-readable storage medium/device including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A method for measuring the thickness variation and shape of wafers, the method comprising:
    calibrating characteristics of a cavity formed between two reference flats in two opposing interferometer channels, wherein calibrating characteristics of said cavity comprises measuring a first cavity phase map of the entire cavity without a wafer in the cavity and producing a second cavity phase map by removing a tilt of the first cavity phase map;
    placing the wafer in the cavity immediately upon completion of calibrating the cavity characteristics;
    synchronizing interferograms in the two interferometer channels by supplying light from a single wavelength tunable laser light source, an output beam of which is split by a beam splitter to propagate to both interferometer channels;
    measuring the cavity characteristics of the two reference flats forming the cavity, wherein measuring the cavity characteristics comprises:
        providing an oversized field of view of the wafer in the cavity;
        using the oversized field of view of the wafer to measure a third cavity phase map and to obtain a difference map from the cavity areas outside of the wafer, wherein the third cavity phase map is of the cavity areas outside of the wafer, and wherein the difference map is the difference between the third cavity phase map and the second cavity phase map in the areas outside of the wafer; and
        measuring a cavity tilt of the two reference flats;
    surface fitting at least a second order function to the difference map from the cavity areas outside the wafer;
    utilizing coefficients of the at least a second order function determined by surface fitting to provide cavity tilt estimation; and
    determining the thickness variations of the wafer based on the cavity characteristic measurements and the cavity tilt of the two reference flats.

2. The method of claim 1, wherein the step of measuring the cavity tilt includes a step of measuring the cavity tilt substantially simultaneously with mapping of opposite surfaces of the wafer.

3. The method of claim 1, wherein the cavity areas outside of the wafer form a ring area around the wafer, and wherein surface fitting at least a second order function to the difference map from the cavity areas outside the wafer includes surface fitting for the ring area around the wafer.

4. The method of claim 1, wherein surface fitting at least a second order function to the difference map includes surface fitting a function of greater than second order to take into consideration cavity shape changes due to at least one of temperature variations and stress.

5. A method for measuring the thickness variation and shape of polished opaque plates, the method comprising:
    placing a plate in a cavity formed between two reference flats in two opposing interferometer channels, wherein the cavity is defined by areas outside of the plate when the plate is placed;
    synchronizing interferograms in the two interferometer channels by supplying light from a single wavelength tunable laser light source, an output beam of which is split by a beam splitter to propagate to both interferometer channels; and
    calibrating cavity characteristics;
        wherein calibrating cavity characteristics comprises:
        measuring a first cavity phase map of the entire cavity without the plate in the cavity and producing a second cavity phase map by removing a tilt of the first cavity phase map;
        after the plate is placed in the cavity, measuring the cavity characteristics of the reference flats forming the cavity providing using an oversized field of view of the plate to measure a plate cavity phase map in the areas outside of the plate;
        obtaining a difference map, wherein the difference map is obtained from the difference between the plate cavity phase map and the second cavity characteristics phase map in the areas outside of the plate;
        surface fitting to determine at least a second order function to the difference map;
        utilizing coefficients of the at least a second order function to provide cavity tilt estimation; and
        determining the thickness variations of the plate based on the cavity characteristic measurements and the cavity tilt estimation.

6. The method of claim 5, wherein the step of measuring the cavity characteristics includes a step of measuring the cavity tilt substantially simultaneously with mapping of opposite surfaces of the plate.

7. The method of claim 5, further including the step of calibrating characteristics of the cavity prior to placing the plate in the cavity.

8. The method of claim 5, wherein the first and second interferometer devices are Fizeau interferometers.

9. The method of claim 5, wherein surface fitting to determine at least a second order function to the difference map includes surface fitting only for the cavity areas outside the plate, wherein the cavity areas outside the plate form a ring around the plate.

10. The method of claim 5, wherein surface fitting at least a second order function to the difference map includes surface fitting a function of greater than second order to take into consideration cavity shape changes due to at least one of temperature variations and stress.

11. The method of claim 5, wherein calibrating cavity characteristics further comprises:
performing one or more steps periodically, wherein performing one or more steps periodically comprises performing the one or more steps at least every 24 hours.

12. An apparatus for measuring the thickness variation and shape of a polished opaque plate, the apparatus comprising:
first and second spaced apart reference flats having corresponding first and second parallel reference surfaces forming a cavity therebetween for placement of the plate, the reference surfaces providing an oversized field of view of the plate in the cavity;
first and second interferometer devices located on diametrically opposite sides of the cavity to map the opposite first and second surfaces of the plate;
a light source optically coupled to the first and second interferometer devices, the light source comprising an illuminator configured for producing light of multiple wavelengths;
first and second interferogram detectors; and
at least one processing unit coupled to receive the outputs of the first and second interferogram detectors for determining thickness variations of the plate, the at least one processing unit configured for calibrating cavity characteristics;
wherein calibrating cavity characteristics comprises configuring the at least one processing unit to perform the following steps:
measuring a first cavity phase map of the entire cavity without the plate in the cavity and producing a second cavity phase map by removing a tilt of the first cavity phase map;
after the plate is placed in the cavity, measuring the cavity characteristics of the reference flats to obtain a plate phase map from the cavity areas outside the plate;
obtaining a difference map in the cavity areas outside of the plate, wherein the difference map is the difference between the plate phase map and the second cavity phase map in the areas outside the plate;
surface fitting at least a second order function to the difference map from the cavity areas outside the plate;
utilizing coefficients of the at least a second order function determined by surface fitting to provide cavity tilt estimation; and
determining the thickness variations of the plate based on the cavity characteristics and the cavity tilt estimation.

13. The apparatus of claim 12, wherein the at least a second order function is a function of greater than second order.

14. The apparatus of claim 12, wherein measuring the cavity characteristics includes a step of measuring the cavity tilt substantially simultaneously with mapping of opposite surfaces of the plate.

15. The apparatus of claim 12, wherein the at least one processing unit is further configured for calibrating characteristics of the cavity prior to placing the plate in the cavity.

16. The apparatus of claim 13, wherein the first and second interferometer devices are Fizeau interferometers.

17. The apparatus of claim 13, wherein the apparatus is configured for measuring the thickness variation and shape of a silicon wafer.

18. The apparatus of claim 12, wherein surface fitting at least a second order function to the difference map includes surface fitting only for the cavity areas outside the plate, and wherein the cavity areas outside the plate at least partially form a ring around the plate.

19. The apparatus of claim 12, wherein repeatedly calibrating cavity characteristics further comprises:
configuring the processing unit to perform one or more steps periodically, wherein perform one or more steps periodically comprises performing the one or more steps at least every 24 hours.

* * * * *